Jan. 25, 1927.
E. A. RUSSELL
1,615,774
FLEXIBLE JOINT
Filed Aug. 18, 1921
2 Sheets-Sheet 2
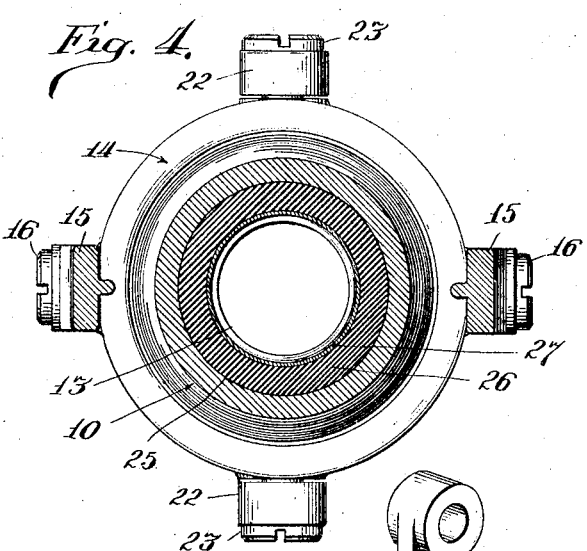
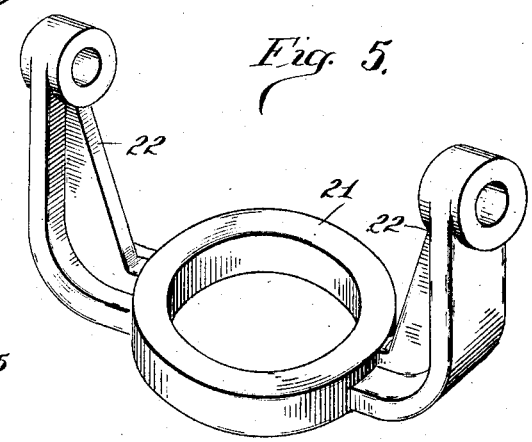
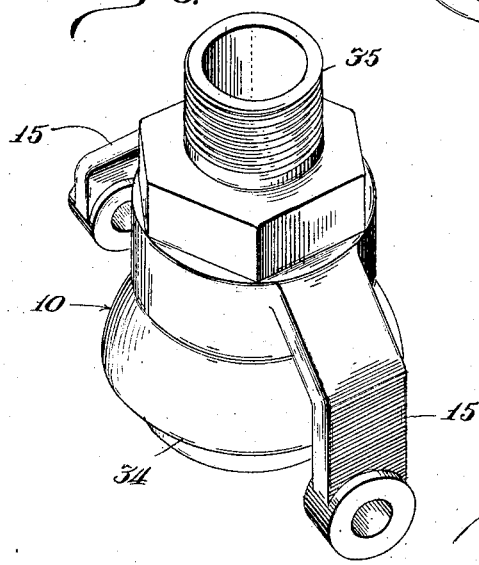
Inventor
Edward A. Russell
By Barnett Jinman
Attorneys Patented Jan. 25, 1927.

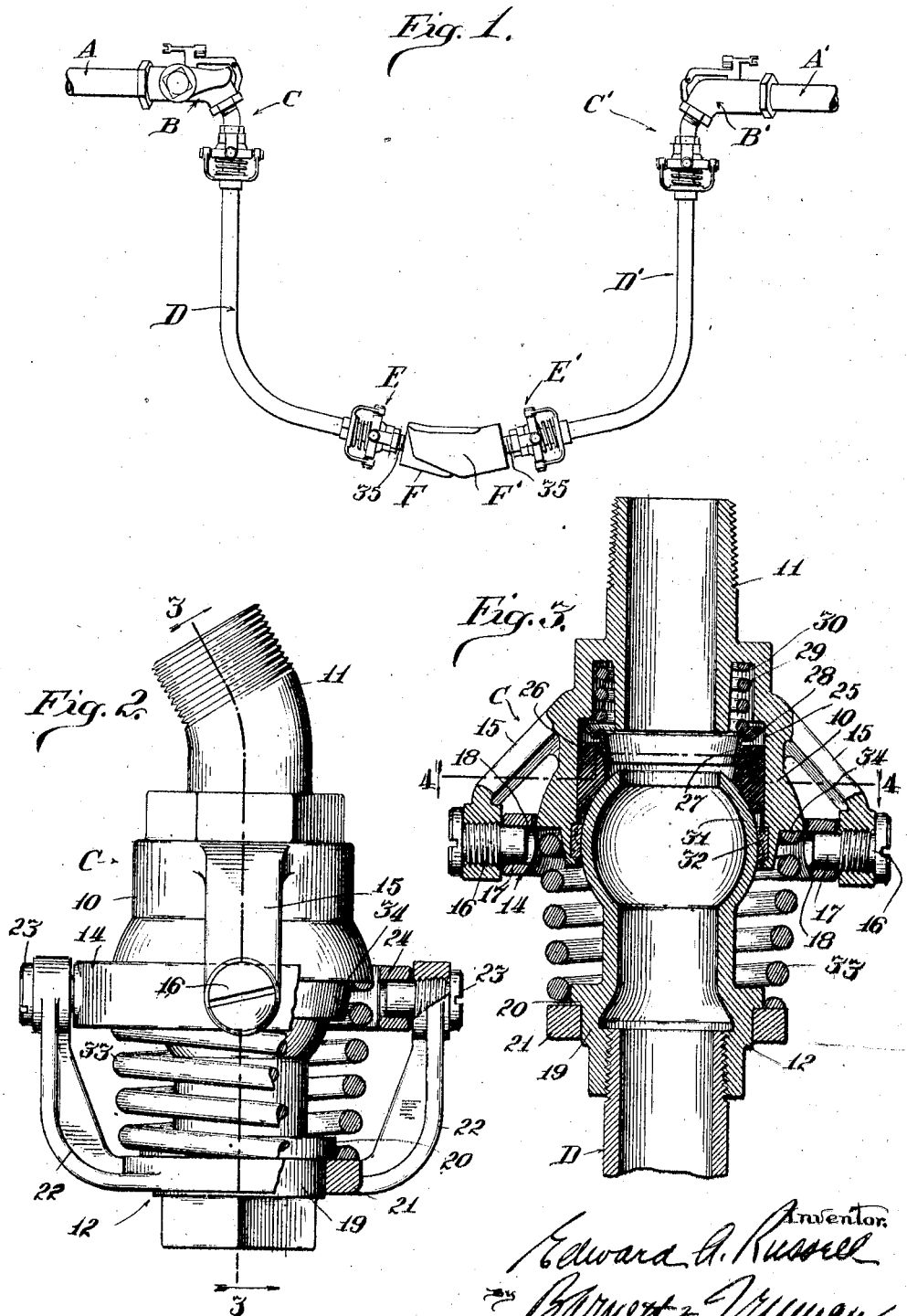

1,615,774

UNITED STATES PATENT OFFICE.

EDWARD A. RUSSELL, OF CHICAGO, ILLINOIS, ASSIGNOR TO VAPOR CAR HEATING COMPANY, INC., OF CHICAGO, ILLINOIS, A CORPORATION OF NEW YORK.

FLEXIBLE JOINT.

Application filed August 18, 1921. Serial No. 493,220

My invention relates to a metallic, flexible pipe connection, the principal object of the invention being to provide an improved tubular structure composed of flexibly articulated members for connecting the steam train pipes of the adjacent railway cars of a train; although the novel device of my invention might be used in connecting air train pipes or for making a coupling between any two pipes where flexibility in the connection and its capacity for withstanding considerable internal pressure are desiderata.

The present invention is an improvement upon the flexible pipe connection shown in my co-pending application Serial No. 472,470, filed May 25, 1921; the improvement consisting in a simplification of the structure which reduces cost of manufacture and decreases the weight of the connection, the latter being a consideration of some importance.

The invention is illustrated, in a preferred embodiment, in the accompanying drawings, wherein—

Fig. 1 is a side elevation showing the pipe connection constructed in accordance with my invention installed between the steam train pipes of two railroad cars.

Fig. 2 is a view, in elevation, with parts in section, of one of the universal joints employed in the pipe connection shown in Fig. 1.

Fig. 3 is a longitudinal sectional view of the joint taken on line 3—3 of Fig. 2.

Fig. 4 is a sectional plan on line 4—4 of Fig. 3.

Fig. 5 is a view, in perspective, of the yoke swiveled to the ball member of the joint, and Fig. 6 is a perspective view of the socket member of the joint.

Referring to the drawings, A, A' designate the steam train pipes on adjacent cars of a railway train, and B, B' the end valves on pipes A, A', respectively. The pipes are connected by means of two identical structures consisting essentially of universal joints C, C', curved pipe sections D, D', universal joints E, E' and couplers F, F'. The couplers may be any of the couplers commonly used for coupling together, for example, the hoses ordinarily employed for making the connection between railway train pipes.

The universal joint C (or C') is illustrated in detail in Figs. 2 to 6 inclusive. The joint E (or E') is of identical construction except for one slight difference to be noted hereafter. The joint is constructed as follows: 10 is a socket member having a threaded nipple 11 which is bent at an angle for engagement with end valve B, the bend in the nipple being for the purpose of disposing the joint in a substantially vertical position. 12 is a ball member into which is screwed the upper end of pipe D, the ball 13 of which projects into the socket member 10. 14 is a ring to which the ball and socket members are pivoted on axes at right angles to each other. In the construction shown the socket member is formed integrally with a yoke consisting of a pair of arms 15, 15 into the ends of which are screwed pivot studs 16, the extremities 17 of which project into openings 18 formed in the ring. The ball member is formed with a boss 19 provided with a flange 20 against which seats an annular member 21 (Fig. 5) provided with arms 22 into which are screwed pivot studs 23 adapted to fit into openings 24 arranged at right angles to the openings 18. The yoke member 21, 22 has a swiveled relation with the ball member.

The socket member 10 is formed interiorly with a cylindrical surface 25 and between this surface and the inner end of the ball 13 is arranged an annular gasket or packing member 26 formed preferably with a tapered bore into which fits the tapered flange 27 of a follower 28 against which bears a coiled spring 29 located in a recess 30 formed in the socket member. The gasket extends for a substantial distance beyond the ball along the bore of the socket member so that fluid pressure will expand its inner end radially into sealing contact with the socket member. The socket member is formed near its outer end with an interior groove 31 in which is fitted a dust ring 32 adapted to bear against the ball 13.

Preferably a coiled spring 33 is interposed between the ring 21 and a shoulder 34 formed on the socket member. This spring, the employment of which is optional, serves the function of keeping the ball and socket members in substantial alignment except when flexed by the movements of the cars.

The joint E (or E') is of the same construction as joint C except that the nipple 35 of joint E, corresponding to nipple 11 of joint C, is straight instead of being bent. The joint E is reversed, with respect to joint C, the socket member being attached to coupler F and the ball member to the curved pipe D.

Assuming that each of the pipes A, A' is provided with the flexible connecting structure as shown, the pipes are connected together by coupling the couplers F, F' in the usual manner. By employing, for either connecting structure, one of the standard couplers, the connection may be coupled with any of the rubber hose connections commonly employed with the train pipes of railway cars at the present time. Assuming that the couplers F, F', are couplers of the gravity type, the articulations at C and E will permit the couplers to be brought together and separated as readily and conveniently as if rubber hoses were used. In fact, the structure has greater flexibility than a rubber hose of large diameter both to accommodate coupling and uncoupling and also to take care of the movements due to shifting of the position of the cars in rounding curves. The swivel connection of one conduit member with respect to the other permits the faces of the couplers to be brought accurately into alignment even though the end valves are not set to exactly the correct angular position with respect to each other. When the connection is on a car at the end of the train so that it is not held up from the track by engagement of the coupler with a mating coupler, the springs 33 serve to maintain the articulated parts of the connection in approximately their normal positions, or at least these springs prevent sagging to an extent sufficient to hold the coupler up from the roadbed.

I claim:

1. A flexible pipe connection comprising a socket member, a ball member within but out of contact with the socket member, a ring surrounding said members, means comprising a pair of diametrically arranged pivots for connecting the socket to the ring, means comprising a pair of diametrically arranged pivots at substantially right angles to the first named pivots for connecting the ball to said ring, and a gasket having a curved surface bearing against the inner end of the ball and extending inwardly from the ball along the inner surface of the socket, said socket and gasket being formed so that the gasket may move freely toward the ball as its surface in contact therewith wears and so that the inner end of the gasket is expansible radially into sealing contact with the socket.

2. A flexible pipe connection comprising a pair of conduit members, one provided with a ball and the other with a cooperating socket, a gasket in the socket in position to be thrust by fluid pressure against the ball, said socket and gasket being formed with contacting surfaces which permit the free longitudinal movement of the gasket as its surface against the ball wears a ring surrounding said members, means for pivoting said members to the ring on axes at substantially right angles to each other, the socket member being formed with an interior groove near its extremity, and a dust ring in the groove bearing against the ball.

3. A flexible pipe connection comprising a pair of conduit members, one provided with a ball and the other with a cooperating socket, a gasket in position to be thrust by fluid pressure against the ball, a ring surrounding said members, yokes associated with said members, respectively, which are pivoted to the ring on axes at right angles to each other, one of said yokes being rotatable upon the conduit member with which it is associated, and a spring interposed between the rotatable yoke and the conduit member with which the other yoke is associated.

4. A flexible pipe connection comprising a socket member, a ball member projecting thereinto, a ring surrounding the socket member, arms on the socket member provided with pivot studs engaging the ring, a yoke member swiveled on the socket member and provided with pivot studs engaging the ring at right angles to the axes of the other studs, a gasket in the socket arranged to be outwardly pressed against the ball member by fluid pressure, said socket and gasket being formed with contacting surfaces which permit the free longitudinal movement of the gasket as its surface against the ball wears and a spring arranged between the swiveled yoke and the socket member.

5. A flexible pipe connection comprising a socket member, a ball member projecting thereinto, a ring surrounding the socket member, arms on the socket member provided with pivot studs engaging the ring, a yoke member swiveled on the socket member and provided with pivot studs engaging the ring at right angles to the axes of the other studs, a gasket in the socket arranged to be outwardly pressed against the ball member by fluid pressure, said socket and gasket being formed with contacting surfaces which permit the free longitudinal movement of the gasket as its surface against the ball wears and a dust ring between the outer end of the socket member and the ball.

6. A flexible pipe connection comprising a socket member, a ball member projecting thereinto, a ring surrounding the socket member, arms on the socket member provided with pivot studs engaging the ring, a yoke member swiveled on the socket member and provided with pivot studs engaging the ring at right angles to the axes of the other studs, a gasket in the socket arranged to be outwardly pressed against the ball member by fluid pressure, said socket and gasket being formed with contacting surfaces which permit the free longitudinal movement of the gasket as its surface against the ball wears said gasket being formed with a tapered bore, a follower having a tapered portion adapted to fit into said bore, and a spring adapted to bear against said follower.

7. In a flexible pipe connection, the combination of a socket member having an interior cylindrical surface, a ball member, means for articulating said members so that they can move angularly in all directions with respect to each other, a gasket having a cylindrical outer surface to bear against the cylindrical surface of the socket member and a conical inner surface, a follower having a conical portion to fit into the conical bore of the gasket, an outwardly projecting flange, and a spring adapted to bear against said flange.

8. In a flexible pipe connection, the combination of a socket member, a ball member within and spaced from the socket member, means for holding the ball properly spaced within the socket member but allowing universal movement thereof, a gasket arranged between the socket member and the inner end of the ball member, said gasket and socket member being formed with contacting surfaces which permit the gasket to slide in the socket member as the surface of the gasket bearing against the ball wears, and a packing ring bearing against the ball member which is arranged in fixed position in the socket member at a place outwardly of the place of bearing of the gasket.

9. In a flexible pipe connection, the combination of a socket member, a ball member within and spaced from the socket member, means for holding the ball properly spaced within the socket member but allowing universal movement thereof, a gasket arranged between the socket member and the inner end of the ball member, said gasket and socket member being formed with contacting surfaces which permit the gasket to slide in the socket member as the surface of the gasket bearing against the ball wears, a packing ring bearing against the ball member which is arranged in fixed position in the socket member at a place outwardly of the place of bearing of the gasket, and a spring which bears against said gasket.

10. In a flexible pipe connection, the combination of a socket member, a ball member within and spaced from the socket member, a gasket arranged between the socket member and the inner end of said ball member, said gasket and socket member being formed with contacting surfaces which permit the gasket to slide in the socket member as the surface of the gasket bearing against the ball wears, a packing ring bearing against the ball member which is arranged in fixed position in the socket member at a place outwardly of the place of bearing of the gasket, the inner end of the gasket being beveled interiorly, a conical follower to bear against said beveled surface, and a spring bearing against said follower.

EDWARD A. RUSSELL.